United States Patent [19]

Harvey et al.

[11] 3,807,024
[45] Apr. 30, 1974

[54] METHOD OF REPLACING A DAMAGED TUBE IN A TUBE WALL

[75] Inventors: Gordon Lindsay Harvey, Esher, Surrey; Robert Lidstone Dennett, Hownslow, Middlesex, both of England

[73] Assignees: Foster Wheeler Corporation, Livingston, N.J.

[22] Filed: July 10, 1972

[21] Appl. No.: 270,345

[30] Foreign Application Priority Data
July 15, 1971  Great Britain.................. 33,384/71

[52] U.S. Cl..................... 29/401, 29/157.4, 29/464, 29/491, 29/DIG. 48, 138/97
[51] Int. Cl............................ B23p 7/00, B23q 3/00
[58] Field of Search .......... 29/401, 157.4, 464, 491, 29/493, DIG. 48; 138/97

[56] References Cited
UNITED STATES PATENTS

| | | | |
|---|---|---|---|
| 2,618,234 | 11/1952 | Armacost.......................... | 29/493 X |
| 3,341,930 | 9/1967 | Belanger.............................. | 29/401 |
| 3,616,516 | 11/1971 | Corriston............................. | 29/401 |
| 3,638,684 | 2/1972 | Pavilon................................ | 138/97 |

FOREIGN PATENTS OR APPLICATIONS
549,590  12/1957  Canada............................ 29/491

*Primary Examiner*—Charles W. Lanham
*Assistant Examiner*—D. C. Reiley, III
*Attorney, Agent, or Firm*—John Maier, III et al.

[57] ABSTRACT

This disclosure relates to the repair of a damaged tube in an upright finned tube wall of a boiler or fired heater. The damaged region of the tube and its associated fins are removed, the length of fin removed being greater than the length of tube removed so as to leave lengths of tube projecting beyond the fin top and bottom. An annular guide ring is fitted over the length of tube projecting beyond the fin at the bottom, the ring resting on the cut back fins. Then a new length of finned tube having fins of shorter length top and bottom than the length of new tube is positioned and aligned in the place of the removed defective tube, the new length having an upper annular guide ring supported on the fins of the new length of tube. The new length of tube is then welded in place by downhand welds, the annular rings serving as guides for the downhand weld, and the repair completed by welding the fins of the new length of tube to the fins of the adjacent existing tubes so as to seal the tube wall. In this way a quick and satisfactory temporary repair can be made by a relatively unskilled workman and so the disclosure is useful in connection with boilers for ships. Thereafter a permanent repair can be made when the ship is in port by a skilled welder.

6 Claims, 11 Drawing Figures

PATENTED APR 30 1974 3,807,024
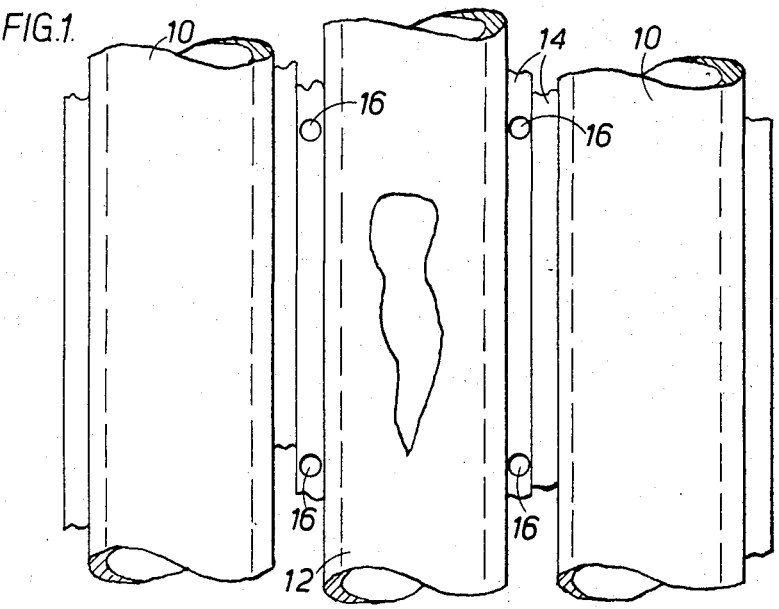
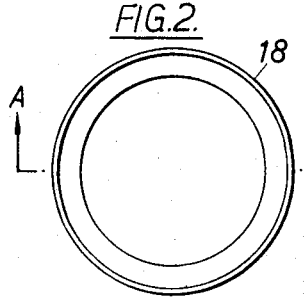
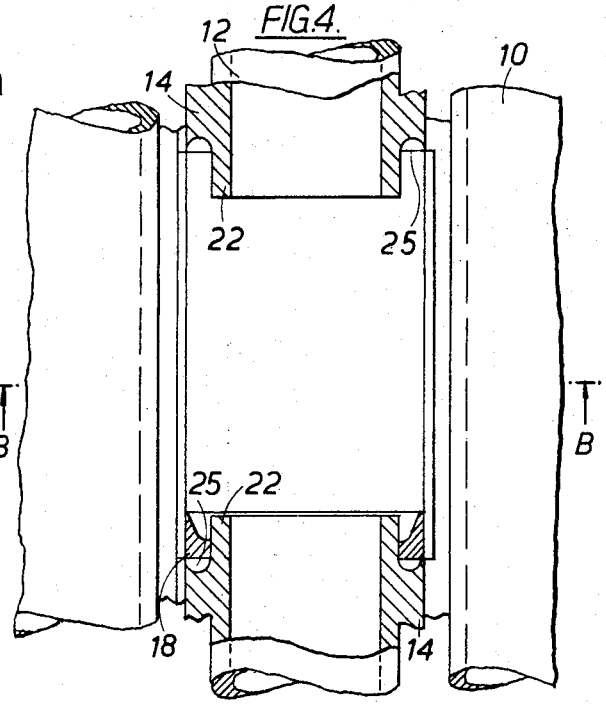
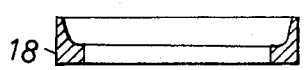
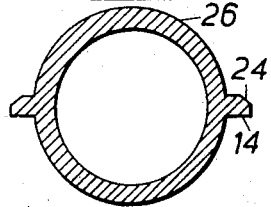

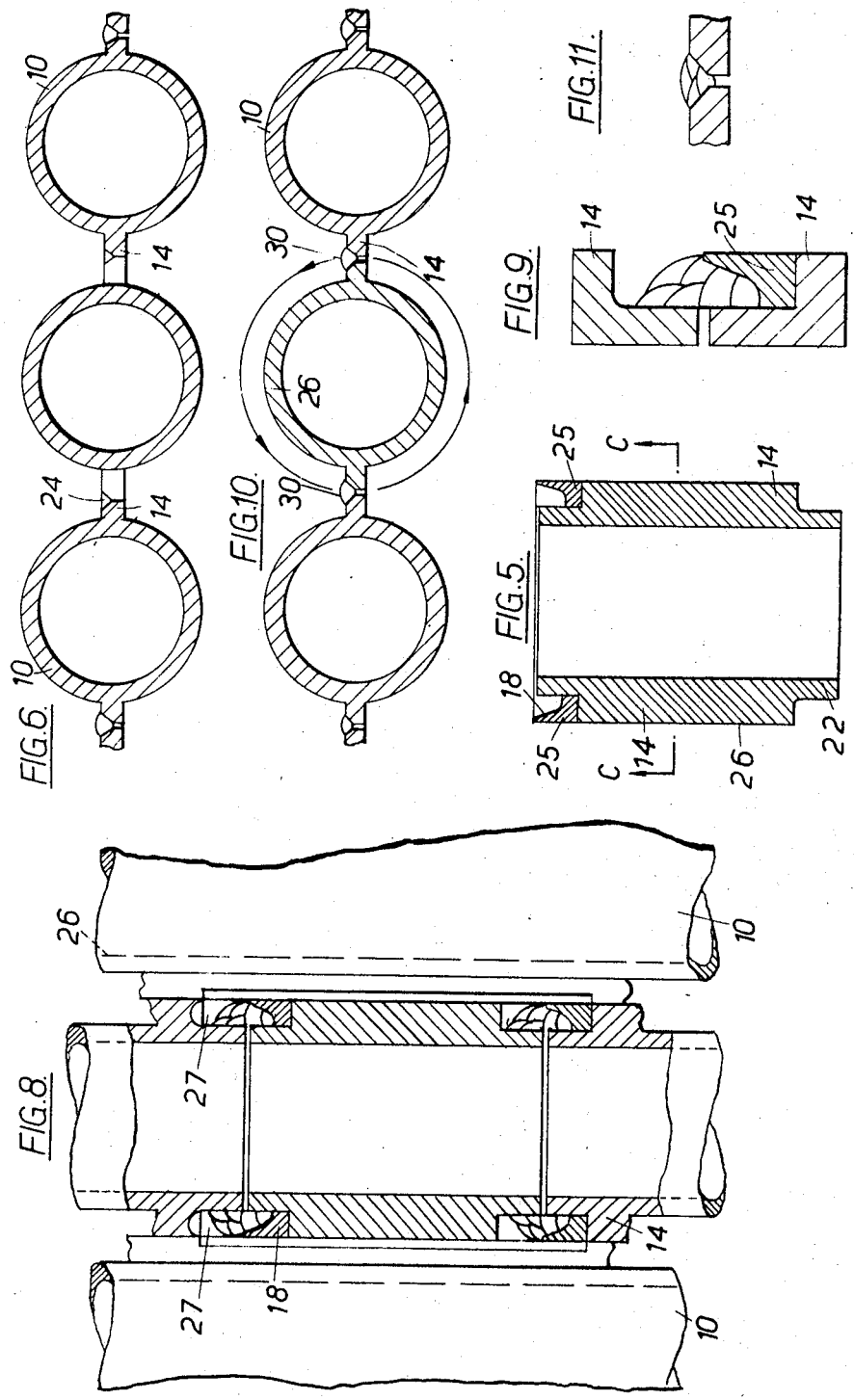

METHOD OF REPLACING A DAMAGED TUBE IN A TUBE WALL

BACKGROUND TO THE INVENTION

In some boilers the tubes are finned longitudinally and welded together to form upright gas-tight walls. Because of the difficulty of repairing these tubes by cutting out and replacing the complete tube, a quick and reliable method of repairing the tube locally must be devised. One such method comprises simply placing a patch over the defective area and welding round it. However, this has the disadvantage that the patch is subject to pressure over its whole area and in the case of a faulty weld is liable to blow off.

Another problem arises when the failure occurs in a ship's boiler at sea since no first-class welder is likely to be present. Therefore, a method is required which can be carried out by an unclassified welder and which is acceptable to the main insurance and survey authorities such as Lloyds who will accept a weld-repaired tube by an unclassified welder provided the weld is carried out downhand. The ship can then be got back to port where a more permanent repair can be effected.

Downhand welding is simply the deposition of molten metal onto the parts to be joined.

The invention has therefore been made with the above points in mind.

BRIEF DESCRIPTION OF THE DISCLOSURE

According to the disclosure there is provided a method of repairing a damaged tube in an upright finned tube wall in which the tube and its associated fins are cut out over the damaged region, the fins being removed top and bottom over a larger distance than the tube, positioning a new length of finned tube having fins of shorter length top and bottom than the length of the new length of tube into the region cut-away so that the new length of tube is aligned with the cut tube with an upper annular guide ring supported on the fins of the new length of tube in a position to form a guide for a downhand welding step to seal over the joint between the upper end of the new tube and the severed upper end, and with a lower annular guide ring supported on the cut back fins of the tube wall in a position to form a guide for a downhand welding step to seal over the join between the lower end of the new length of tube and the severed lower end, thereafter making downhand welds to seal the new length of tube to the old tube and welding the fins of the new length to the fins of the adjacent existing tubes to seal the tube wall.

The method according to the invention provides a neat and safe repair which will only leak in the event of defective welds. Furthermore, downhand welding is used for the repair it can therefore be carried out by unclassified welder such as a ship's engineer, and so if the damage occurs in a ship at sea a repair can be effected which Lloyds will accept until a major refit is carried out when the whole tube can be replaced by a highly skilled welder.

The damaged tube is located and an access panel is cut in the outer casing. The damaged section of tube and its associated fins are cut away over the damaged section leaving a gap between the ends of the remaining tube. The fins on the remaining tube ends are then cut back so that the ends of the tube protrude slightly beyond the ends of the fins. The tube ends are squared off and the fins on the tubes adjacent to the cut tube are chamferred.

An annular guide ring having its inside face chamferred so that one face of the ring has a smaller internal diameter than the other face, is then placed over one of the protruding ends of the cut-away tube. The guide ring acts as a guide for the first downhand weld deposit and therefore other weld passes can be built upon this deposit.

A new tube having fins of shorter length top and bottom than the length of the new tube has a guide ring inserted over one of its ends, and the whole put in position in the region cut-away so that the new tube is aligned with the cut tube. The new length of tube is held in position with tack-welds on the fins, a gap being left between the ends of the new tube and those of the cut tube.

Preferably first weld pass is made on one side of the tube, from fin to fin, the weld then chipped and cleaned, and the weld pass finished on the other side of the tube, in the same direction round the tube. A second weld pass is then carried out in the same direction round the tube, starting the weld pass at the opposite fin to where the previous weld was completed. The complete repair must usually have a minimum of six passes, each weld being cleaned before starting the next weld.

Finally, the fins of the new tube are welded to the fins of the adjacent tubes preferably using a minimum of four passes. Any gaps remaining in the fins are then covered by welding patches over them or simply depositing metal around the edge of the hole until the fin is complete.

BRIEF DESCRIPTION OF THE DRAWINGS

The disclosure will now be illustrated with reference to the accompanying diagrams in which:

FIG. 1 is a side elevation of part of a tube panel showing a defective tube;

FIG. 2 is a plan view of a guide ring;

FIG. 3 is a cross-sectional view taken on the line A—A of FIG. 2;

FIG. 4 is a part sectioned side elevation of part of the tube panel after removal of the damaged section of tube.

FIG. 5 is an axial-section of the new length of tube.

FIG. 6 is a cross-sectional view taken on the line B—B of FIG. 4.

FIG. 7 is a cross-sectional view taken on the line C—C of FIG. 5.

FIG. 8 is a side elevation of the tube panel showing a cross-section through the new tube in position.

FIG. 9 is a detailed cross-section of one of the downhand welds joining the new length of tube to the old tube.

FIG. 10 is a cross-sectional view similar to FIG. 6 after the new length of tube has been welded in position.

FIG. 11 is a cross-sectional view of the fins of the new length of tube welded to the fins of adjacent tubes.

DESCRIPTION OF THE PREFERRED EMBODIMENTS

The tube comprises a plurality of finned tubes, adjacent fins being welded to one another.

To effect a repair, the damaged tube is located and an access panel is cut in the outer casing. Two holes 16 are then drilled through each of the fins 14 attached to the damaged tube 12 and beyond the actual damage. Two further holes 16 are drilled through the fins 14 at the other end of the damage. The damaged section can then be removed using for example a cutting wheel, saw or an oxy acetylene burner.

After removal of the damaged length of tube and its associated fins, two ends 22 remain on the cut-away tube 12. The fins 14 on these ends are cut back so that each end 22 protrudes slightly beyond the fins.

The ends 22 of the tube 12 are squared off and the fins 14 which are attached to the undamaged tubes 10 are chamferred.

A lower annular guide ring 18 shown in FIGS. 2 and 3 has one of its inside corners chamferred so that the interior diameter of one face is slightly larger than that of the other face. The ring 18 is inserted over the end of one of the protruding ends 22 of the fixed tube 12, the ring being supported in position on the cut-back fins 25.

The fins 14 on either side of the new length of tube 26 are chamferred, and cut back, so that fins have a shorter length top and bottom than the length of the new tube.

The ends of the new length of tube 26 are squared off and an upper annular guide ring 18 inserted over the end to be supported by the fins to sit on the ends 25 of the cut-away fins.

The upper annular guide ring is then in a position to form a guide for a downhand weld pass.

The new length of tube 26 is then put into position in the tube panel, and is secured in position by tack-welding the fins 14 of the replacement tube to the fins of the adjacent tubes, the tube being held in correct alignment with a gap of about 1.6 mm between the tube ends of the replacement tube and those of tube 12.

A first weld pass is then made on one side of the tube from A to B as shown in FIG. 10. The weld end is then chipped and cleaned before finishing the weld pass from B' to A' on the other side of the tube. On completion of the weld from both sides, the second pass is completed going from B' to A' and then from A to B. The complete repair preferably has a minimum of six passes as shown in FIG. 9, each weld being cleaned before starting the next pass.

The fins of the new length of tube are then welded to the fins of the adjacent tubes 10 preferably using a minimum of four passes. (FIG. 11). Suitable patches are welded over holes 27 remaining in the fins, and the weld is built up until a complete fin is formed. Alternatively, metal can simply be welded around the hole in the fin, adding metal until the fin is complete.

The disclosure thus provides a neat, simple and effective repair for damaged tubes in a tube-panel, and has the great advantage that downhand-welding is utilized. This means that a repair which is carried out in a ship at sea is acceptable to the insurance authorities until a repair can be effected by a skilled welder when the ship is refitted at port.

A latitude of modification, change and substitution is intended in the foregoing disclosure and in some instances some features of the disclosure will be employed without a corresponding use of other features. Accordingly it is appropriate that the appended claims be construed broadly and in a manner consistent with the spirit and scope of the disclosure herein.

We claim:

1. A method of repairing a damaged tube in an upright finning tube wall comprising the steps of:
   a. removing the tube and its associated fins over the damaged region, the length of each fin removed being greater than the length of the tube removed, thereby leaving a downwardly projecting upper length of tube and an upwardly projecting lower length of tube,
   b. fitting a lower annular guide ring over said upwardly projecting lower length of tube, said ring resting in said fins,
   c. providing a length of new tube to replace said length of removed and damaged tube, said length of new tube having fins of shorter length top and bottom than the length of said new tube,
   d. fitting an upper annular guide ring over said upper end of said new length of tube so that said ring rests on said fins of said new length of tube,
   e. positioning said new length of tube together with said upper annular guide ring in alignment with said projecting upper and lower lengths of tube in said tube wall with said fins of said new length of tube aligned with said fins of said tube wall,
   f. making downhand welds to provide seals between the upper and lower ends of said new length of tube and said downwardly projecting upper length of tube and said upwardly projecting lower length of tube, respectively, said upper and lower guide rings serving to guide the downhand welding, and
   g. welding said fins of said new length of tube to said fins of adjacent existing tubes to seal said tube wall.

2. A method according to claim 1 in which after said new length of tube has been positioned and aligned, and its fins aligned, said fins of said new length of tube are tack-welded to said fins of adjacent existing tubes so as to hold said new length of tube in place while said downhand welds are made.

3. A method according to claim 1 in which each pass of said downhand welds comprises depositing weld metal around approximately 180° from one fin to the other, cleaning the ends of the deposited metal, and then depositing weld metal around the remainder of the tube from fin to fin.

4. A method according to claim 1 in which each downhand weld consists of at least six welding passes.

5. A method according to claim 1 in which said fins of said new length of tube are welded to said fins of adjacent existing tubes by at least four welding passes.

6. A new length of tube having a pair of diametrically opposed fins of shorter length than the length of said tube for use in the method of claim 1.

* * * * *